(12) United States Patent
Ishimaru et al.

(10) Patent No.: US 11,919,280 B2
(45) Date of Patent: Mar. 5, 2024

(54) LASER-PRINTABLE FILM AND PACKAGING IN WHICH SAME IS USED

(71) Applicant: TOYOBO CO., LTD., Osaka (JP)

(72) Inventors: Shintaro Ishimaru, Fukui (JP); Masayuki Haruta, Fukui (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/768,346

(22) PCT Filed: Oct. 20, 2020

(86) PCT No.: PCT/JP2020/039354
§ 371 (c)(1),
(2) Date: Apr. 12, 2022

(87) PCT Pub. No.: WO2021/079868
PCT Pub. Date: Apr. 29, 2021

(65) Prior Publication Data
US 2023/0001679 A1 Jan. 5, 2023

(30) Foreign Application Priority Data
Oct. 25, 2019 (JP) .................. 2019-194323

(51) Int. Cl.
| | |
|---|---|
| *B32B 27/36* | (2006.01) |
| *B32B 1/00* | (2006.01) |
| *B32B 3/26* | (2006.01) |
| *B32B 27/08* | (2006.01) |
| *B32B 27/18* | (2006.01) |
| *B65D 65/40* | (2006.01) |

(52) U.S. Cl.
CPC ............... *B32B 27/36* (2013.01); *B32B 1/00* (2013.01); *B32B 3/263* (2013.01); *B32B 27/08* (2013.01);
(Continued)

(58) Field of Classification Search
CPC ........... B32B 27/36; B32B 1/00; B32B 3/263; B32B 27/08; B32B 27/18;
(Continued)

(56) References Cited

U.S. PATENT DOCUMENTS

| | | |
|---|---|---|
| 2016/0168399 A1 | 6/2016 | Matoda et al. |
| 2018/0229422 A1 | 8/2018 | Inoue et al. |

FOREIGN PATENT DOCUMENTS

| | | |
|---|---|---|
| EP | 0 152 265 | 8/1985 |
| JP | 2002-362027 | 12/2002 |

(Continued)

OTHER PUBLICATIONS

English machine translation for JP2004-268554. (Year: 2004).*
(Continued)

*Primary Examiner* — Michael C Miggins
(74) *Attorney, Agent, or Firm* — Wenderoth, Lind & Ponack, L.L.P.

(57) ABSTRACT

A polyester-based film comprising at least one layer permitting printing as a result of laser irradiation; wherein not less than 100 ppm but not greater than 3000 ppm of laser-printable metal is present in all layers of the film. The film is capable of being printed in distinct fashion by a laser, excels with respect to unevenness in thickness, and is of high transparency, while at the same time provide packaging which employs such film and on which printing has been directly carried out.

18 Claims, 1 Drawing Sheet

(52) U.S. Cl.
CPC .............. *B32B 27/18* (2013.01); *B65D 65/40* (2013.01); *B32B 2250/244* (2013.01); *B32B 2250/40* (2013.01); *B32B 2255/10* (2013.01); *B32B 2255/20* (2013.01); *B32B 2255/28* (2013.01); *B32B 2307/308* (2013.01); *B32B 2307/402* (2013.01); *B32B 2307/414* (2013.01); *B32B 2307/418* (2013.01); *B32B 2307/54* (2013.01); *B32B 2307/7244* (2013.01); *B32B 2307/7246* (2013.01); *B32B 2307/732* (2013.01); *B32B 2307/75* (2013.01); *B32B 2439/00* (2013.01)

(58) Field of Classification Search
CPC .......... B32B 2250/244; B32B 2255/10; B32B 2255/20; B32B 2255/28; B32B 2307/308; B32B 2307/402; B32B 2307/414; B32B 2307/418; B32B 2307/54; B32B 2307/7244; B32B 2307/732; B32B 2307/75; B32B 2439/00
See application file for complete search history.

(56) References Cited

FOREIGN PATENT DOCUMENTS

| | | |
|---|---|---|
| JP | 2004-268554 | 9/2004 |
| JP | 2010-209148 | 9/2010 |
| JP | 2013-503065 | 1/2013 |
| JP | 5344750 | 11/2013 |
| JP | 2017-196896 | 11/2017 |
| JP | 2017-209847 | 11/2017 |
| WO | 2011/026106 | 3/2011 |
| WO | 2014/188828 | 11/2014 |

OTHER PUBLICATIONS

Written Opinion of the International Searching Authority dated Jan. 12, 2021 in International (PCT) Application No. PCT/JP2020/039354.
International Search Report dated Jan. 12, 2021 in International (PCT) Application No. PCT/JP2020/039354.
Atsushi Taniguchi; Miko Cakmak, "The suppression on strain induced crystallization in PET through sub micron $TiO_2$ particle incorporation", Polymer, 2004, vol. 45, pp. 6647-6654.
Office Action dated Aug. 8, 2023, in Chinese Patent Application No. 202080069541.3, with English translation.
Office Action dated Sep. 4, 2022, in Japanese Patent Application No. 2021-553449, with English translation.
Extended European Search Report dated Oct. 27, 2023 in corresponding European Patent Application No. 20880190.2.
Office Action dated Dec. 11, 2023 in Chinese Patent Application No. 202080069541.3 (English translation).

* cited by examiner

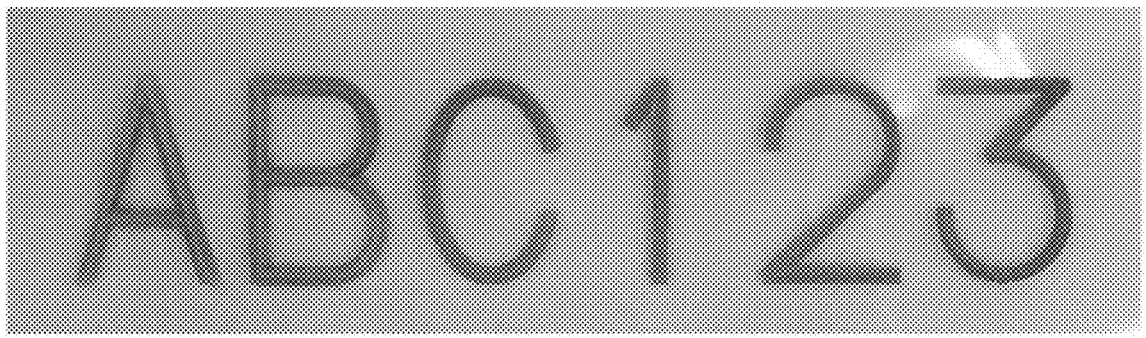

LASER-PRINTABLE FILM AND PACKAGING IN WHICH SAME IS USED

TECHNICAL FIELD

The present invention relates to film capable of being favorably used in packaging comprising printing or other such display. In particular, the present invention relates to polyester-based film permitting printing by means of a laser, and also relates to packaging comprising label(s) and/or lid member(s) corresponding thereto.

BACKGROUND ART

Packaging has conventionally been employed in supply chain goods as typified by foods, pharmaceutical agents, and industrial products. For the most part, such packaging not only protects the contents but also has the role of displaying information pertaining to the product name, manufacturing date, raw materials, and so forth. As means for achieving such display, labels (tack labels) at which adhesive is applied on the back surface of a substrate permitting printing by means of thermal transfer or ink as described for example at Patent Reference No. 1 are in wide use. A tack label is such that information is printed in advance on the front surface constituting the display surface thereof, and while in this state is affixed to a release sheet (liner), this being removed from the liner and affixed to packaging during use. After the tack label has been affixed thereto, because the liner no longer serves a purpose, the more labels that are used the greater will be the increase in trash that is produced. Furthermore, as the label user must have labels of differing displayed content in correspondence to the types of contents to which they pertain, management of labels grows increasingly complex as the types of contents increase, and this has brought with it the increased likelihood that a mistake might be made with respect to which label is affixed to what. Moreover, it has normally been necessary to have on hand an excess supply thereof so as to be ready in the event of a shortage, which has meant that when manufacture or sale of the contents to which they pertain is terminated, there being no further use for such labels, it has been the case that they are discarded. Tack labels have thus been besought with various deficiencies.

To eliminate the foregoing problems, Patent Reference No. 2 discloses a heat-sensitive film having a heat-sensitive recording layer. Because the film of Patent Reference No. 2 changes color when affected by heat, the packaging itself has display capability. For this reason, it does not require use of the foregoing tack label. Furthermore, because, during an operation in which a pouch is formed from packaging employing a film such as that at Patent Reference No. 2, it will be possible, by incorporating a thermal printer or other such printing device therein, to cause pouch forming and display to be completed in a single operation, it has also contributed to reduction in labor and reduction in cost. Because of the advantages possessed thereby, techniques in which printing is carried out directly on the packaging itself have recently become popular. However, because when a heat-sensitive layer is provided on a film constituting the substrate there is a possibility that rubbing or the like with the exterior will cause delamination of the heat-sensitive layer, it has normally been the case that a protective layer has been provided over (toward the surface layer from) the heat-sensitive layer. As means for providing such functional layers, coating is widely and commonly employed. Because coating involves passage through at least application, drying, and winding operations, the greater number of functional layers the more operations there will be, causing reduction in productivity. Moreover, because such functional layers have particles, there has also been the problem that transparency has been reduced in correspondence to the thicknesses of the layers.

On the other hand, as display (printing) means, not only techniques in which the heat and ink cited above but also those in which lasers serve as trigger have recently become popular. For example, Patent Reference No. 3 discloses a multilayer laminated film for laser printing in which a printing layer comprises a layer consisting of an ink composition that is capable of being printed by means of laser light. Use of this film makes it possible to cause change in color at locations irradiated by a laser, permitting printing to be carried out. Note, however, that because multilayer laminated films such as the film disclosed at Patent Reference No. 3—like the film of Patent Reference No. 2—require that a printing layer be provided over the film substrate, problems such as delamination of layers and reduction in productivity remain unsolved.

Furthermore, Patent Reference No. 4 discloses an additive for laser marking that consists of bismuth oxide. Kneading this additive into a plastic makes it possible to cause change in color at locations irradiated by a laser, permitting printing to be carried out. Whereas plastics alone do not normally undergo reaction due to lasers, this additive can be made to undergo excitation by the energy from a laser, making it possible to cause a change in the color of the plastic. Because the additive is disposed at the interior of the film, the fact that the delamination of functional layers which occurred with coatings tends not to occur makes this useful. But because the additive is metal particulate, the problem remains that—like the foregoing coating—this causes reduction in the transparency of the film. Furthermore, the inventor(s) discovered that kneading particles into the film results in a problem in that unevenness in film thickness occurs when the film is stretched.

Patent Reference No. 5 discloses a polyester film that becomes colored when acted on by laser light. Surface roughness of this film is 0.10 μm to 1.00 μm, and a surfacemost portion on at least one side thereof has a matte-like texture. For this reason, there has been the problem that it cannot be used in applications in which transparency or suitability for printing is demanded. Moreover, there is no mention of unevenness in film thickness in Patent Reference No. 5.

PRIOR ART REFERENCES

Patent References

Patent Reference No. 1: Japanese Patent Application Publication Kokai No. 2002-362027
Patent Reference No. 2: Japanese Patent Application Publication Kokai No. 2017-209847
Patent Reference No. 3: Japanese Patent Application Publication Kokai No. 2017-196896
Patent Reference No. 4: International Patent Application Publication No. 2014/188828
Patent Reference No. 5: Japanese Patent No. 5344750

Nonpatent References

Nonpatent Reference No. 1: Atsushi Taniguchi; Miko Cakmak. The suppression of strain induced crystallization in PET through sub micron TiO2 particle incorporation. Polymer. 2004, vol. 45. p. 6647-6654.

SUMMARY OF INVENTION

Problem to be Solved by Invention

It is an object of the present invention to solve problems of the conventional art such as the foregoing. That is, it is an object of the present invention to provide a film that is capable of being printed in distinct fashion by a laser, that excels with respect to unevenness in thickness, and that is of high transparency. It is at the same time an object of the present invention to provide packaging which employs such film and on which printing has been directly carried out.

Means for Solving Problem

That is, the present invention is constituted as follows.

1. A polyester-based film characterized in that it has at least one layer permitting printing as a result of laser irradiation;
wherein not less than 100 ppm but not greater than 3000 ppm of laser-printable metal is present in all layers of the film; and
haze thereof is not less than 1% but not greater than 40%.

2. The polyester-based film according to 1. characterized in that the metal permitting printing as a result of laser irradiation which is contained therein is at least one species—whether present alone or in oxide form—among bismuth, gadolinium, neodymium, titanium, antimony, tin, and aluminum.

3. The polyester-based film according to 1. or 2, characterized in that thickness of the layer permitting printing as a result of laser irradiation is not less than 5 μm but not greater than 100 μm.

4. The polyester-based film according to any of 1. through 3. characterized in that color L* value thereof is not less than 90 but not greater than 95; and color b* value thereof is not less than 0.1 but not greater than 2.

5. The polyester-based film according to any of 1. through 4, characterized in that unevenness in thickness thereof in either a machine direction or a transverse direction is not less than 0.1% but not greater than 20%.

6. The polyester-based film according to any of 1. through 5. characterized in that it comprises at least one layer that is disposed adjacent to the layer permitting printing as a result of laser irradiation and that does not undergo printing as a result of the laser irradiation.

7. The polyester-based film according to any of 1. through 6, characterized in that refractive indices in the machine direction and the transverse direction (Nx and Ny) are such that the higher therebetween is not less than 1.63.

8. The polyester-based film according to any of 1. through 7, characterized in that thermal shrinkage in either the machine direction or the transverse direction following exposure for 30 minutes to 140° C. hot air is not less than 0.5% but not greater than 8%.

9. Packaging comprising a label or lid member employing the polyester-based film according to any of claims 1. through 8.

10. The packaging according to 9, characterized in that at least a portion thereof has undergone printing.

BENEFIT OF INVENTION

The present invention makes it possible to provide a film in accordance therewith that is capable of being printed in distinct fashion by a laser, that excels with respect to unevenness in thickness, and that is of high transparency. It at the same time an object of the present invention to make it possible to provide packaging which employs such film and on which printing has been directly carried out.

BRIEF DESCRIPTION OF DRAWINGS

[FIGURE] Image printed by causing film in accordance with Working Example 1 to be irradiated by a laser

EMBODIMENTS FOR CARRYING OUT INVENTION

Below, description is given with respect to polyester-based film in accordance with the present invention.

Polyester-based film in accordance with the present invention has at least one layer permitting printing by means of a laser, and preferably has properties and constitution as described below.

1. Raw Materials Making Up Film
1.1. Pigment for Use in Laser Printing

So that film in accordance with the present invention might be made printable by a laser, pigment having ability to cause film color to change when acted on by laser irradiation (hereinafter sometimes referred to simply as "pigment") must be added thereto. Because the polyester resin that makes up film will itself have almost no reaction to laser light, it is ordinarily incapable of permitting printing by means of laser irradiation. Pigment can be made to undergo excitation by the energy from laser light, and cause carburization of the surrounding polyester resin (preferred conditions for laser irradiation will be described below). Furthermore, besides causing carburization of polyester resin, there are pigments which, depending on the type thereof, may themselves change color and become black. Such simple or compound alteration of color makes it possible for film to be made printable. Based upon consideration of the precision of film printability, it is preferred that pigment which itself also changes color be used.

As pigment type, any of bismuth, gadolinium, neodymium, titanium, antimony, tin, and aluminum—whether present alone or in oxide form—may be cited. Furthermore, it is preferred that pigment particle diameter be not less than 0.1 μm but not greater than 10 μm. When pigment particle diameter is less than 0.1 μm, there is a possibility that change in color when irradiated by a laser will no longer be adequate. Furthermore, when particle diameter is greater than 10 μm, there is a tendency for film haze to exceed 40%, and for the color b value to exceed 2. It is more preferred that particle diameter be not less than 0.5 μm but not greater than 9 μm. As pigments which meet these conditions, "Tomatec Color" (manufactured by Tokan Material Technology Co., Ltd.), "Iriotec (Registered Trademark)" (manufactured by Merck Performance Materials), and so forth are commercially available and may be favorably used.

It is necessary that the amount of pigment added within the laser printing layer be not less than 100 ppm but not greater than 3000 ppm. When the amount of pigment that is added thereto is less than 100 ppm, this is not preferred because the print density produced by the laser will no longer be adequate. On the other hand, when the amount of pigment that is added thereto is greater than 3000 ppm, this is not preferred because there will be a tendency for film haze, color value, and unevenness in thickness to exceed prescribed ranges therefor. With respect to the effect that addition of pigment has on haze and color value, this is caused not only by the color of the pigment itself but is also due to scattering of light by pigment particles.

Furthermore, where the film is subjected to stretching, there is occurrence of a phenomenon whereby presence of pigment particles causes unevenness in film thickness to worsen. With respect to the effect on unevenness in film thickness, this is thought to be due to reduction in stretching stress occurring when film comprising pigment particles is stretched. FIG. 3 (b) of Nonpatent Reference No. 1 includes a stretch-strain curve of polyethylene terephthalate film at which microparticles in the form of titanium dioxide have been added, it being indicated thereat that the stress at the time of completion of stretching decreases as the concentration of titanium dioxide added thereto is increased. This is thought to be due to the fact that, as shown in FIGS. 10 and 11 of Nonpatent Reference No. 1, presence of microparticles causes suppression of the oriented crystallization of macromolecule chains that would otherwise have occurred during stretching. Because the higher the stretching stress the more satisfactory the film will be with respect to unevenness in thickness, it is fair to say that increase in the concentration with which microparticles are added will cause worsening of unevenness in thickness. It is more preferred that the amount of pigment that is added thereto be not less than 150 ppm but not greater than 2950 ppm, and still more preferred that this be not less than 200 ppm but not greater than 2900 ppm.

Furthermore, in accordance with the present invention, the equivalent amount of pigment that would need to be added when expressed as a fraction of all layers of the film may be not less than 100 ppm but not greater than 3000 ppm. Where layer(s) other than the laser printing layer are provided, the equivalent amount of pigment to be added when expressed as a fraction of all layers of the film will result in a calculation indicating that will be less than the amount at the laser printing layer. But based upon consideration of the fact that in accordance with the present invention the laser printing layer makes up the major part (50% or more) of the total thickness of all layers, and the fact that increasing the thickness of other layer(s) would cause relative decrease in the thickness of the laser printing layer to the point where it would be too thin and this would cause printing precision to be sacrificed, the equivalent amount of pigment when expressed as a fraction of all layers of the film can be taken to be an approximation of the amount contained in the laser printing layer.

As method for blending laser pigment within the polyester resin that makes up the film of the present invention, it might for example be added at any desired step(s) during manufacture of the polyester resin. Furthermore, methods in which a vented kneader extruder is used to cause polyester-based resin raw material and a slurry in which the particles are dispersed in ethylene glycol, water, and/or other solvent(s) to be blended, methods in which a kneader extruder is used to cause the dried particles and polyester to be blended, and so forth may also be cited. Of these, methods in which a kneader extruder is used to cause the dried particles and polyester to be blended (made into a masterbatch) are preferred.

1.2. Types of Polyester Raw Material

With regard to the polyester raw material that makes up the film of the present invention, there is no particular limitation with respect thereto so long as it is a macromolecular species having ester bonds, it being possible to make free use thereamong without departing from the gist of the present invention. As polyester raw material, polyethylene terephthalate (PET), polybutylene terethalate (PBT), polyethylene naphthalate (PEN), polytrimethylene terephthalate (PTT), polybutylene naphthalate (PBN), polylactic acid (PLA), polyethylene furanoate (PEF), polybutylene succinate (PBS), and so forth may be cited as examples. Moreover, in addition to the polyesters cited at the foregoing examples, it is also possible to use modified polyesters in which the monomer(s) at such acid site and/or diol site are altered. As acid-site monomer, isophthalic acid, 1,4-cyclohexanedicarboxylic acid, 2,6-naphthalene dicarboxylic acid, orthophthalic acid, and other such aromatic dicarboxylic acids, adipic acid, azelaic acid, sebacic acid, decanedicarboxylic acid, and other such aliphatic dicarboxylic acids, and alicyclic dicarboxylic acids may be cited as examples. Furthermore, as diol-site monomer, neopentyl glycol, 1,4-cyclohexanedimethanol, diethylene glycol, 2,2-diethyl-1,3-propanediol, 2-n-butyl-2-ethyl-1,3-propanediol, 2,2-isopropyl-1,3-propanediol, 2,2-di-n-butyl-1,3-propanediol, hexanediol, 1,4-butanediol, and other such long-chain diols, hexanediol and other such aliphatic diols, bisphenol A and other such aromatic-type dials, and so firth may be cited as examples. Moreover, as component making up polyester, this may include polyester elastomer(s) comprising ε-caprolactone, tetramethylene glycol, and/or the like.

Regarding the polyester raw materials cited above, it is possible to use raw material in which a plurality of species of homopolyester, each of which has polymerized therein one species of carboxylic acid monomer and one species of dial monomer, are mixed (dry blended); and it is possible to use raw material in which two or more species of carboxylic acid monomer and/or two or more species of diol monomer are copolymerized. Furthermore, it is possible to use raw material in which homopolyester(s) and copolymerized polyester(s) are mixed.

1.3. Additives Other than Laser Pigment

Any of various additives, e.g., e.g., waxes, antioxidants, antistatic agents, crystal nucleating agents, viscosity-lowering agents, thermal stabilizers, colorant pigments, antistaining agents, ultraviolet light absorbers, and/or the like, may be added as necessary within the polyester resin that makes up the film of the present invention. Furthermore, it is preferred that microparticles serving as lubricant for improving the lubricity of the film be added at least at a surfacemost layer of the film. Any desired microparticles may be chosen. For example, as inorganic-type microparticles, silica, alumina, titanium dioxide, calcium carbonate, kaolin, barium sulfate, and so forth may be cited; as organic-type microparticles, acrylic resin particles, melamine resin particles, silicone resin particles, crosslinked polystyrene particles, and so forth may be cited. Average particle diameter of microparticles when measured by means of a Coulter counter may be chosen as appropriate as needed within the range 0.05 μm to 3.0 μm. It is preferred that the lower limit of the range in values for the fractional amount of microparticles present within the film be 0.01 wt %, more preferred that this be 0.015 wt %, and still more preferred that this be 0.02 wt %. Below 0.01 wt %, there can be reduction in lubricity. It is preferred that the upper limit of the range in values be 1 wt %, more preferred that this be 0.2 wt %, and still more preferred that this be 0.1 wt %. Greater than 1 wt % is not preferred, because there can be reduction in transparency.

As method for blending particles within the polyester resin that makes up the film of the present invention, while these might for example be added at any desired step(s) during manufacture of the polyester resin, it is preferred that these be added in the form of a slurry in which they are dispersed in ethylene glycol or the like at a step before initiation of the polycondensation reaction, after completion of the transesterification reaction, or the esterification step, and that the polycondensation reaction be made to proceed. Furthermore, methods in which a vented kneader extruder is used to cause polyester-based resin raw material and a slurry in which the particles are dispersed in ethylene glycol, water, and/or other solvent(s) to be blended, methods in which a kneader extruder is used to cause the dried particles and polyester to be blended, and so forth may also be cited.

2. Layered Constitution of Film

2.1 Layered Constitution

It is necessary that the film of the present invention have at least one layer permitting printing by means of a laser (hereinafter "laser printing layer") and comprising pigment described at 1.1. "Pigment for Use in Laser Printing". As layered constitution of the film, this may be such that there is only a single layer in the form of a laser printing layer, or layer(s) other than the laser printing layer may be laminated therewith. As described above, printing by means of laser takes place through carburization of the polyester resin that makes up the laser printing layer. For this reason, with a single-layer constitution in which there is only a laser printing layer, there is a tendency for the printing region to feel rough when touched with the fingers or the like. It is therefore preferred that a layer that does not react when acted on by laser irradiation be laminated to the face on at least one side of the laser printing layer so that there is less of a tendency for laser printing to produce a perceptible difference when touched with the hand. A most-preferred layered constitution is a constitution in which there are three layers of two species, the laser printing layer being (a central layer which is) straddled by layers that do not react when acted on by laser irradiation.

To cause the printing characteristics and/or lubricity of the film surface to be made satisfactory, it is possible for the film of the present invention to be made to comprise layer(s) that have undergone corona treatment, coating treatment, flame treatment, and/or the like, it being possible for same to be comprised thereby as desired without departing from the requirements of the present invention. Where the layered constitution of the film is such that there are three layers of two species, the central layer may be the laser printing layer, and the surfacemost layers might for example be layers that have been made to possess respectively different functionalities such might have been accomplished by causing lubricant to be present thereat or as a result of having undergone corona treatment.

In addition to the foregoing layered constitution, a film in accordance with the present invention may comprise gas barrier layer(s). By causing gas barrier layer(s) to be present thereat, it is possible to improve the gas barrier properties of the film, and to improve the shelf life of the contents when this is used as packaging. It is preferred that the gas barrier layer be constituted from inorganic thin film(s) in which the primary constituent is metal or metal oxide, there being no objection regardless of whether this is disposed at surfacemost layer(s) or at the central layer. It is moreover preferred that the gas barrier layer be transparent. In addition to the foregoing gas barrier which is composed of inorganic thin film, the present invention may moreover have an anchor coat layer which is provided below the inorganic thin film layer (between the inorganic thin film and the film which is composed of resin) and/or an overcoat layer which is provided above the inorganic thin film. By causing such layer(s) to be present thereat, it is possible to anticipate improvement in closeness of contact between gas barrier layers) and film layer(s), improvement in gas barrier properties, and so forth. Requirements regarding the constitutions of the respective layers will be described below.

Furthermore, to improve the design characteristics thereof when used as packaging, the film of the present invention may be provided with lettering and/or pictorial content other than that which is printed by means of laser. As material for constituting such lettering and/or pictorial content, gravure ink, flexographic ink, and/or other such known substance(s) may be used. Regarding the number of printing layer(s), there may be one such layer or there may be a plurality of such layers. So as to be able to improve design characteristics by printing a plurality of colors, it is preferred that there be printing layer(s) that comprise a plurality of layers. There will be no objection regardless of whether printing layer(s) are disposed at surfacemost layers) or at the central layer.

2.2. Laser Printing Layer Thickness

It is preferred that thickness of the laser printing layer be not less than 5 μm but not greater than 100 μm. When thickness of the laser printing layer is less than 5 μm, this is not preferred, as the print density produced when irradiated by a laser will be reduced, making it difficult to visually perceive lettering. On the other hand, when thickness of the laser printing layer is greater than 100 μm, this is not preferred because there will be a tendency for film haze and/or color value to exceed prescribed ranges therefor. It is more preferred that thickness of the laser printing layer be not less than 10 μm but not greater than 95 μm, and still more preferred that this be not less than 15 μm but not greater than 90 μm.

3. Film Properties

3.1. Haze

It is preferred that the film of the present invention be such that the haze thereof is not less than 1% but not greater than 40%. When haze is greater than 40%, this is not preferred, not only because it will cause the film to lose transparency, resulting in deterioration in ability to visually perceive contents when used as packaging, but also because it will make it difficult to visually perceive the lettering which is obtained that is produced by laser irradiation. In contradistinction to alteration of color by conventionally disclosed art employing mere laser marking, because the film of the present invention requires that lettering produced by laser irradiation be readable, it requires a high degree of definiteness. It is more preferred that haze be not greater than 35%, and still more preferred that this be not greater than 30%. On the other hand, whereas a low haze value is preferred in that the lower this is the more improved the transparency will be, the level of the art of the present invention is such that the lower limit of the range in values therefor is 1%, and as a practical matter it will be adequate even where the lower limit of the range in values therefor is 2%.

3.2. Color L* Value

It is preferred that the film of the present invention be such that the color L* value thereof is not less than 90 but not greater than 95. The color L* value is an indication of the lightness of the film, the higher the value the greater the lightness. When the color L* value is less than 90, this is not preferred, not only because it will cause the film to exhibit dull color tone, causing it to appear less visually attractive when used as packaging, but also because it will make it difficult to visually perceive the lettering which is obtained that is produced by laser irradiation. As per the content of the foregoing description given with respect to haze, because the film of the present invention requires that lettering produced by laser irradiation be readable, it requires a high degree of definiteness. It is more preferred that the color L* value be not less than 90.5, and still more preferred that this be not less than 91. On the other hand, the level of the art of the present invention is such that the upper limit of the range in values for the color L* value is 95, and as a practical matter it will be adequate even where the upper limit of the range in values therefor is 94.5.

3.3. Color b* Value

It is preferred that the film of the present invention be such that the color b* value thereof is not less than 0.1 but not greater than 2. The color b* value is an indication of the yellow hue of the film, the higher the value the more yellow the hue. When the color b* value is 2 or higher, the color tone of the film will be such that it exhibits an intense yellow hue. Use of such a film is not preferred because it would tend to cause occurrence of problems such as, for example, the fact that design characteristics are made worse and yellow hues following printing treatment are made more intense than would have initially been expected to be printed. It is more preferred that the color b* value be not greater than 1.8, and still more preferred that this be not greater than 1.6. On the other hand, the level of the art of the present invention is such that the lower limit of the range in values for the color b* value is 0.1, and as a practical matter it will be adequate even where the lower limit of the range in values therefor is 0.2.

3.4. Unevenness in Thickness

It is preferred that the film of the present invention be such that unevenness in the thickness thereof in either the machine direction or the transverse direction be not less than 0.1% but not greater than 20%. What is referred to here as unevenness in thickness is the difference between the maximum value and the minimum value obtained when a continuous contact thickness gauge is used to measure film thickness along an arbitrary length divided by the average value thereof. The smaller the value of the unevenness in thickness the better will be the precision with respect to thickness. When the unevenness in thickness is greater than 20%, this is not preferred because it would tend to cause occurrence of such problems as a poorly wound state due to surface irregularities and/or wrinkling and/or sagging when wound up into a roll. It is more preferred that the unevenness in thickness thereof be not greater than 18%, and still more preferred that this be not greater than 16%. On the other hand, with regard to the lower limit of the range in values for unevenness in thickness, the level of the art of the present invention is such that 0.1% constitutes the limit thereof. It will be adequate even where the lower limit of the range in values for unevenness in thickness is 1%. It is still more preferred that unevenness in thickness be within the foregoing range in both the machine direction and the transverse direction.

3.5. Thickness

It is preferred that total thickness of all layers of the film of the present invention be not less than 8 µm but not greater than 200 µm. If film thickness is less than 8 µm, this is not preferred because it would cause handling characteristics to worsen, and would make handling difficult during printing or other such secondary treatment. On the other hand, while there would be no objection were film thickness to be greater than 200 µm, this is not preferred because it would cause the weight of film used to increase and would cause increase in chemical cost. It is more preferred that thickness of the film be not less than 13 µm but not greater than 195 µm, and still more preferred that this be not less than 18 µm but not greater than 190 µm.

3.6. Refractive Index

It is preferred that the film of the present invention be such that refractive index in the machine direction or the transverse direction (Nx or Ny) be such that the higher value is not less than 1.63. Refractive index is an indication of the molecular orientation of the film, the higher the refractive index the greater the molecular orientation. Particularly with stretched films, refractive index tends to be higher for larger stretching stresses. Based upon consideration of the relationship between unevenness in thickness and stretching stress described at 1.1. "Pigment for Use in Laser Printing," above, because it will facilitate achieving an unevenness in thickness of not greater than 20%, it is preferred that refractive index be not less than 1.63. And because it will facilitate achieving a film tensile fracture strength of not less than 80 MPa, it is preferred that refractive index be not less than 1.63. It is more preferred that refractive index be not less than 1.635, and still more preferred that this be not less than 1.64.

3.7. Thermal Shrinkage

It is preferred that the film of the present invention be such that thermal shrinkage thereof in either the machine direction or the transverse direction following exposure for 30 minutes to 140° C. hot air be not less than 0.5% but not greater than 8%. When thermal shrinkage is greater than 8%, this is not preferred because it would cause the film to tend to deform when subjected to heat sealing or other such treatment comprising heating. It is more preferred that the upper limit of the range in values for the thermal shrinkage thereof be not greater than 7.8%, and more preferred that this be not greater than 7.6%. On the other hand, whereas the lower the thermal shrinkage the more preferred this will be, the level of the art of the present invention is such that the lower limit of the range in values therefor is 0.5%. As a practical matter it will be adequate even where the lower limit of the range in values for thermal shrinkage is 0.7%. It is still more preferred that thermal shrinkage be within the foregoing range in both the machine direction and the transverse direction.

3.8. Tensile Fracture Strength

It is preferred that the film of the present invention be such that tensile fracture strength thereof in either the machine direction or the transverse direction be not less than 80 Mpa but 300 MPa. When tensile fracture strength is less than 80 MPa, this is not preferred because it would cause fracture to easily occur due to tensile forces from the path line that act thereon during manufacture when it is unwound at the time of secondary treatment such as printing, vapor deposition, or lamination. On the other hand, whereas a high tensile fracture strength is preferred in that the higher this is the more improved the mechanical strength of the film will be, the level of the art of the present invention is such that the upper limit of the range in values therefor is 300 MPa. As a practical matter it will be adequate even where the upper limit of the range in values therefor is 290 MPa. It is still more preferred that tensile fracture strength be within the foregoing range in both the machine direction and the transverse direction.

3.9. Intrinsic Viscosity (IV)

It is preferred that the film of the present invention be such that the intrinsic viscosity (IV) thereof is not less than 0.5 dL/g but 0.9 dL/g. When IV is less than 0.5 dL/g, this is not preferred, not only because it would make it difficult to achieve a tensile fracture strength of not less than 80 MPa, but also because it would increase the likelihood of occurrence of fracture at the time that stretching operations are carried out during film formation. On the other hand, when IV is greater than 0.9 dL/g, this is not preferred, because when resins serving as raw materials are mixed and being melt extruded it would cause resin pressure while in the melt zone to become too high and would increase the tendency for filter(s) that remove contaminants from the molten resin to deform. It is more preferred that heat sealing layer IV be not less than 0.52 dL/g but not greater than 0.88 dL/g, and still more preferred that this be not less than 0.54 dL/g but not greater than 0.86 dL/g.

4. Film Manufacturing Conditions 4.1. Mixture and Supply of Raw Materials

In manufacturing the polyester-based film of the present invention, as described above at "1. Raw Materials Making Up Film," pigment permitting printing when acted on by laser irradiation must be present in the film. Because it is preferred that pigment be used in masterbatch form, it will ordinarily be the case that two or more species of raw material will be mixed. It has conventionally been the case that causing two or more species of raw material to be mixed and fed to an extruder has produced variation (segregation) in the supply of raw materials, and has resulted in occurrence of a problem whereby this has caused unevenness in thickness to worsen. To prevent this and to achieve an unevenness in thickness that is within a prescribed range pursuant to the present invention, it is preferred that agitator(s) be installed at hopper(s) and plumbing directly above extruder(s) and that melt extrusion be carried out after raw materials have been uniformly mixed.

4.2. Melt Extrusion

The film of the present invention may be obtained by causing the raw materials described at the foregoing "1. Raw Materials Making Up Film" to be supplied to an extruder in accordance with the method described at the foregoing "4.1. Mixture and Supply of Raw Materials," causing the raw materials to be melt extruded by the extruder to form unstretched film, and carrying out stretching thereof in accordance with a prescribed method as described below. Note that where the film comprises laser printing layer(s) and other layer(s), there will be no objection regardless of whether the timing with which the respective layers are laminated is such that this is carried out before or after stretching. Where lamination is carried out before stretching, it is preferred that a method be adopted in which the resins serving as raw materials for the respective layers are melt extruded at respectively different extruders, and a feedblock or the like is used partway along the resin flow paths to achieve joining thereof. Where lamination is carried out after stretching, it is preferred that lamination in which respectively separately formed films are affixed to each other by means of adhesive and/or extruded lamination in which molten polyester resin is made to flow and be laminate to surface layer(s) of laminated and/or single film(s) be adopted. From the standpoint of productivity, methods in which the respective layers are laminated before stretching is carried out are preferred.

As method for melt extruding resin raw material, known methods may be employed, methods employing extruder(s) equipped with barrel(s) and screw(s) being preferred. It is preferred that a hopper dryer, paddle dryer, or other such dryer and/or vacuum dryer be used in advance to cause polyester raw material to be dried until the moisture content thereof is not greater than 100 ppm, more preferably not greater than 90 ppm, and still more preferably not greater than 80 ppm. After polyester raw material is dried in such fashion, it is extruded in the form of film by means of extruder(s). With respect to extrusion, this may be carried out by adopting the T die method, tubular method, and/or any other such known method as desired. It is preferred that extrusion temperature be not less than 200° C. but not greater than 300° C. When extrusion temperature is less than 200° C., this is not preferred because the melt viscosity of polyester resin will be too high, increasing extrusion pressure and causing deformation of filter(s) present in the melt zone. When heating temperature is greater than 300° C. this will cause thermal decomposition of the resin to proceed and will make it difficult to achieve an IV of not less than 0.5 dL/g.

Furthermore, a high shear rate when resin is expelled from the region of the die orifice is preferred because this will permit reduction in unevenness in thickness in the transverse direction of the film (especially in the region of maximum concavity). This is because a high shear rate will stabilize the pressure at the time that resin is expelled from the T die outlet. It is preferred that shear rate be not less than 100 sec$^{-1}$, even more preferred that this be not less than 150 sec$^{-1}$, and particularly preferred that this be not less than 170 sec$^{-1}$. A high draft ratio is preferred in that this will cause unevenness in thickness in the machine direction to be satisfactory, but too high a draft ratio is not preferred because this would cause debris from resin and so forth to adhere to the region at which resin is expelled from the die, decreasing productivity. The shear rate at the die outlet may be determined from Formula 1, below.

$$\gamma = 6Q/(W \times H^2) \qquad \text{Formula 1}$$

$\gamma$=Shear rate (sec$^{-1}$)
Q=Amount of raw material expelled from extruder (cm$^3$/sec)
W=Width of opening at die outlet (cm)
H=Length of opening at die outlet (lip cap) (cm)

By thereafter quenching the film that is molten due to having been extruded, it is possible to obtain unstretched film. As method for quenching molten resin, a method on which the molten resin from the orifice fixture is cast onto a rotating drum where it is quenched and allowed to solidify to obtain a substantially unoriented resin sheet might be favorably adopted.

The film may be formed in accordance with any of the following techniques: unstretched; uniaxially stretched (stretching in at least one of either the vertical (machine) direction or the horizontal (transverse) direction); biaxially stretched. From the standpoints of mechanical strength and productivity, uniaxial stretching is preferred, and biaxial stretching is more preferred. While the description that follows is given with a focus on the sequential biaxial stretching method employing machine direction stretching—transverse direction stretching in which stretching is first carried out in the machine direction and stretching is subsequently carried out in the transverse direction, there is no objection to transverse direction stretching—machine direction stretching in which the order is reversed, as this will merely cause a change in the principal orientation direction. There would moreover be no objection to the simultaneous biaxial stretching method in which stretching in the machine direction and transverse direction are carried out simultaneously.

4.3. First (Machine Direction) Stretching

Stretching in the first direction (vertical or machine direction) may be carried out by causing the unstretched film to be fed into a machine direction stretching device in which a plurality of groups of rollers are arranged in continuous fashion. In carrying out machine direction stretching, it is preferred that a preheating roller(s) be used to carry out preheating until the film temperature reaches 65° C. to 100° C. When film temperature is less than 65° C., this is not preferred because stretching will be difficult at the time that stretching in the machine direction is carried out, and there will be a tendency for fracture to occur. And when higher than 100° C., this is not preferred because the film will tend to stick to the rollers, and there will be a tendency for fouling of rollers to occur as a result of continuous production and/or winding of film on rollers.

When film temperature reaches 65° C. to 100° C. stretching in the machine direction is carried out. The stretching ratio in the machine direction should be not less than 1× but not greater than 5×. As 1× would mean that there is no stretching in the machine direction, the stretching ratio in the machine direction should be 1× to obtain film which is uniaxially stretched in the transverse direction, and the stretching ratio in the machine direction should be not less than 1.1× to obtain biaxially stretched film. Because causing the stretching ratio in the machine direction to be not less than 1.1× will make it possible impart the film with molecular orientation in the machine direction and increase mechanical strength, this will facilitate achievement of a film tensile fracture strength of not less than 80 MPa.

Moreover, because the higher the stretching ratio in the machine direction the greater the amelioration of unevenness in thickness, it is preferred that the stretching ratio be not less than 2.5×. As described at "1.1. Pigment for Use in laser Printing." an increase in stretching stress will ameliorate unevenness in thickness. Causing stretching ratio to be not less than 2.0× will promote oriented crystallization of the film and make it possible to increase stretching stress. Furthermore, while there is no objection to employment of any value as the upper limit of the range in values for the stretching ratio in the machine direction, as too great a stretching ratio in the machine direction will make it difficult to carry out stretching in the transverse direction and increase the tendency for fracture to occur, it is preferred that this be not greater than 5×. It is more preferred that the stretching ratio in the machine direction be not less than 2.2× but not greater than 4.8×, and still more preferred that this be not less than 2.4× but not greater than 4.6×.

4.4. Second (Transverse Direction) Stretching

Following first (machine direction) stretching, it is preferred that stretching in the transverse direction be carried out at a stretching ratio of on the order of 3× to 5× at a temperature of 65' C to 130° C. while in a state such that the two ends in the transverse direction (the direction perpendicular to the machine direction) of the film are gripped by clips within a tenter. Before carrying out stretching in the transverse direction, it is preferred that preheating be carried out, in which case preheating should be carried out until film surface temperature reaches 70° C. to 135'C.

Because the higher the stretching ratio in the transverse direction the greater the amelioration of unevenness in thickness, it is preferred that the stretching ratio be not less than 2.5×. As described at "4.2. Machine Direction Stretching," because the higher the stretching ratio the greater will be the increase in stretching stress, this will ameliorate unevenness in thickness. On the other hand, when the stretching ratio is greater than 5.5×, this is not preferred because it would increase the tendency for fracture to occur. It is more preferred that the stretching ratio in the transverse direction be not less than 2.7× but not greater than 5.3×, and still more preferred that this be not less than 2.9× but not greater than 5.1×. Note that because the stretching rates are different for stretching in the machine direction versus stretching in the transverse direction (the stretching rate is higher for stretching in the machine direction), the preferred stretching ratio ranges are different.

Following stretching in the transverse direction, it is preferred that the film be made to pass through an intermediate zone in which no procedure such as would cause it to be actively heated is performed. Relative to the zone in which stretching in the transverse direction is carried out at the tenter, because the temperature at the final heat treatment zone that follow is high, failure to establish an intermediate zone would cause heat (hot air itself and/or radiated heat) from the final heat treatment zone to flow into the operation at which stretching in the transverse direction is carried out. If this were to happen, because the temperature in the zone in which stretching in the transverse direction is carried out would not be stable, not only would there be a tendency for unevenness in the thickness of the film to exceed 20%, but there would also be occurrence of variation in thermal shrinkage and other such physical properties. It is therefore preferred that following stretching in the transverse direction the film be made to pass through an intermediate zone until a prescribed time has elapsed before final heat treatment is performed. In this intermediate zone, it is important to block hot air from the final heat treatment zone and from the zone in which stretching in the transverse direction is carried out as well as any concomitant flow that would otherwise accompany movement of the film so that it becomes that rectangular strips come to hang down from above in almost perfectly vertical fashion when those strips have been made to hang down from above while the film is not passing therethrough. It will be sufficient if the time of passage through the intermediate zone is on the order of 1 second to 5 seconds. When the time is less than 1 second, length of time in the intermediate zone will be insufficient, and there will be inadequate heat blocking effect. On the other hand, while longer times in the intermediate zone are preferred, because too long a time therein would result in increased equipment size, on the order of 5 seconds will be sufficient.

4.5. Heat Treatment

Following passage through the intermediate zone, it is preferred at the heat treatment zone that heat treatment be carried out at not less than 170° C. but not greater than 250° C. Because heat treatment promotes crystallization of the film, not only is it possible to reduce any thermal shrinkage that occurred during stretching operation(s), but this will also tend to increase tensile fracture strength. When heat treatment temperature is less than 150° C. this is not preferred because it would make it difficult to achieve a thermal shrinkage of not greater than 3% and a tensile fracture strength of 80 MPa. On the other hand, when heat treatment temperature exceeds 250° C., this is not preferred because haze would tend to be greater than 40%. It is more preferred that the heat treatment temperature be not less than 175° C. but not greater than 245° C., and still more preferred that this be not less than 180° C. but not greater than 240° C.

It is preferred that the time of passage through the heat treatment zone be not less than 2 seconds but not greater than 20 seconds. When the time of passage therethrough is 2 seconds or less, heat treatment will be meaningless because the film will pass through the heat treatment zone without the surface temperature of the film having reached the temperature setpoint. Because the longer the time of passage therethrough the greater will be the effect of heat treatment, it is more preferred that this be not less than 5 seconds. But because attempting to increase the length of time of passage therethrough would result in increased equipment size, as a practical matter it will be adequate if this is not greater than 20 seconds.

During heat treatment, decreasing the distance between tenter clips (causing relaxation in the transverse direction) by some desired ratio will make it possible to reduce thermal shrinkage in the transverse direction. For this reason, it is preferred during final heat treatment that the film be made to undergo relaxation in the transverse direction within the range not less than 0% but not greater than 10% (a percent relaxation of 0% indicating that the film is not made to undergo relaxation). Whereas the higher the percent relaxation in the transverse direction the greater will be the reduction in shrinkage in the transverse direction, as the upper limit of the range in values for the percent relaxation (shrinkage of film in the transverse direction immediately following stretching in the transverse direction) is determined by the raw materials used, the conditions under which stretching in the transverse direction was carried out, and the heat treatment temperature, it will not be possible to cause the film to undergo relaxation to the point where this would be exceeded. At the film of the present invention, the upper limit of the range in values for the percent relaxation in the transverse direction is 10%. Furthermore, during heat treatment, it is also possible to decrease the distance between clips in the machine direction by some desired ratio (to cause relaxation in the machine direction).

4.6. Cooling

Following passage through the heat treatment zone, it is preferred at the cooling zone that a cooling airstream at not less than 10° C. but not greater than 30° C. be used to carry out cooling of the film for a passage time therethrough of not less than 2 seconds but not greater than 20 seconds.

By thereafter causing the film to be rolled up as portions cut from the two ends thereof are removed therefrom, a film roll is obtained.

5. Gas Barrier Layer

The film of the present invention may comprise gas barrier layer(s) primarily composed of inorganic thin film(s). In the description which follows, where a film in accordance with the present invention comprises gas barrier layer(s), this is referred to as a "gas barrier layer laminated body".

5.1. Gas Barrier Layer Laminated Body Properties 5.1.1. Water Vapor Permeability It is preferred that a gas barrier layer laminated body employing the film of the present invention be such that the water vapor permeability thereof under conditions of temperature 40° C. and relative humidity 90% RH be not less than 0.05 [g/(m²·d)] but not greater than 4 [g/(m²·d)]. When water vapor permeability is greater than 4 [g/(m²·d)], this is not preferred because when used as packaging to contain contents the shelf life of the contents would be reduced. On the other hand, whereas a water vapor permeability of less than 0.05 [g/(m²·d)] would be preferred because it would enhance gas barrier properties and increase the shelf life of the contents, the current level of the art is such that the lower limit of the range in values therefor is 0.05 [g/(m²·d)]. As a practical matter it is fair to say that it will be adequate even where the lower limit of the range in values for the water vapor permeability is 0.05 [g/(m²·d)]. It is preferred that the upper limit of the range in values for the water vapor permeability thereof be 3.8 [g/(m²·d)], and more preferred that this be 3.6 [g/(m²·d)].

5.1.2. Oxygen Permeability

It is preferred that a gas barrier layer laminated body employing the film of the present invention be such that the oxygen permeability thereof under conditions of temperature 23° C. and relative humidity 65% RH be not less than 0.05 [cc/(m²·d·atm)] but not greater than 4 [cc/(m²·d·atm)]. When oxygen permeability is greater than 4 [cc/(m²·d·atm)], this is not preferred because the shelf life of the contents would be reduced. On the other hand, whereas an oxygen permeability of less than 0.05 [cc/(m²·d·atm)] would be preferred because it would enhance gas harrier properties and increase the shelf life of the contents, the current level of the art is such that an oxygen permeability of 0.05 [cc/(m²·d·atm)] is the lower limit of the range in values therefor. As a practical matter it is fair to say that it will be adequate even where the lower limit of the range in values for the oxygen permeability is [cc/(m²·d·atm)]. It is preferred that the upper limit of the range in values for the oxygen permeability thereof be 3.8 [cc/(m²·d·atm)], and more preferred that this be 3.6 [cc/(m²·d·atm)].

5.2. Gas Barrier Layer Raw Material Type and Composition

There being no particular limitation with respect to gas barrier layer raw material type, conventionally known materials may be used, it being possible to select therefrom as appropriate in accordance with the object in question to satisfy the desired gas barrier characteristics and/or the like. As gas barrier layer raw material type, silicon, aluminum, tin, zinc, iron, manganese, and other such metals, inorganic compounds comprising one or more of such metals, corresponding inorganic compounds in the form of oxides, nitrides, carbides, fluorides, and so forth may be cited as examples. Any of such inorganic substances and/or inorganic compounds may be used alone, or a plurality thereof may be used. In particular, where silicon oxide (SiOx) or aluminum oxide (AlOx) is used alone (one-member set), or these are used in combination (two-member set), this will be preferred because it will make it possible to achieve improved transparency in the context of a film comprising barrier layer(s). Where the inorganic compound component consists of a two-member set in the form of silicon oxide and aluminum oxide, it is preferred that aluminum oxide be present therein in an amount that is not less than 20 mass % but not greater than 80 mass %, and it is more preferred that this be not less than 25 mass % but not greater than 70 mass %. When the amount of aluminum oxide that is present therein is 20 mass % or less, this is not preferred because there is a possibility that it would cause reduction in gas barrier layer density and worsening of gas barrier characteristics. Furthermore, when the amount of aluminum oxide that is present therein is 80 mass % or greater, this is not preferred because gas barrier layer flexibility would tend to be reduced and cracking would tend to occur, and there is a possibility as a result that worsening of gas barrier characteristics could occur.

When the oxygen/metal element ratio of the metal oxide used in the gas barrier layer is not less than 1.3 but less than 1.8, this is preferred because there will be less variation in gas barrier characteristics, making it possible to always obtain excellent gas barrier characteristics. The oxygen/metal element ratio may be determined by using x-ray photoelectron spectroscopy (XPS) to measure the respective elemental amounts of oxygen and metal, and calculating the oxygen/metal element ratio.

5.3. Gas Barrier Layer Formation Method

There being no particular limitation with respect to the gas barrier layer formation method, known manufacturing methods may be employed so long as they do not impair the object of the present invention. Among known methods, employment of vapor deposition is preferred. As vapor deposition method, vacuum deposition, sputtering, ion plating, and other such PVD(physical vapor deposition) methods, CVD (chemical vapor deposition) methods, and so forth may be cited as examples. Of these, vacuum deposition and physical vapor deposition are preferred, vacuum deposition being particularly preferred from the standpoints of manufacturing speed and stability. As heating technique during vacuum deposition, resistive heating, high-frequency inductive heating, electron beam heating, and/or the like may be employed. Furthermore, reactive deposition may be employed in which reactive gas(es) in the form of oxygen, nitrogen, water vapor, and/or the like are introduced, and/or in which ozone addition is carried out, this is ion assisted, and/or other such means are employed. Furthermore, imparting of a bias or the like to the substrate, causing substrate temperature to be increased or cooled, and/or other such changes may be made to film formation conditions so long as they do not impair the object of the present invention.

A gas barrier layer formation method employing vacuum deposition is described below. During gas barrier layer formation, the film of the present invention is transported by way of metal rollers to gas bather layer manufacturing apparatus(es). By way of example, a gas barrier layer manufacturing apparatus might be constituted so as to comprise unwinding roller(s), coating drum(s), takeup roller(s), electron beam gun(s), crucible(s), and vacuum pump(s). The film might be mounted on the unwinding roller, be made to undergo processing at the coating drum, and be wound by the takeup roller. The film web (within the gas barrier layer manufacturing apparatus) would be subjected to vacuum produced by the vacuum pump, inorganic material placed within the crucible would be evaporated by the beam emitted from the electron gun and vapor deposited onto the film which is made to undergo processing at the coating drum. During vapor deposition of inorganic material, heat is produced at the film, and tension is moreover applied thereto between the unwinding roller and the takeup roller. If the temperature at the film is too high, not only will thermal shrinkage of the film be large, but because softening will be promoted thereby, it will also be the case that the tension will tend to cause occurrence of tensile deformations. Moreover, this is also not preferred because after emerging from the vapor deposition operation the temperature drop (cooling) experienced by the film would be large, the amount of shrinkage (different from thermal shrinkage) following expansion would be large, causing occurrence of cracking at the gas barrier layer and making it difficult to achieve the desired gas barrier characteristics. On the other hand, while the lower the temperature at the film the more preferred this would be because it would permit suppression of deformation of the film, because it would cause reduction in gas barrier layer thickness due to a decrease in the amount of evaporated inorganic material, there is a concern that this could make it impossible to satisfy the desired gas barrier characteristics. It is preferred that the temperature at the film be not less than 100° C. but not greater than 180° C., more preferred that this be not less than 110° C. but not greater than 170° C., and still more preferred that this be not less than 120° C. but not greater than 160° C.

6. Overcoat Layer 6.1. Overcoat Layer Type

The film of the present invention and/or the gas barrier laminated body employing the film of the present invention (these collectively being referred to as "substrate film" in the present Section 6.) may, with the object of further improvement in gas barrier characteristics, abrasion resistance, and/or the like, also comprise overcoat layer(s) over gas barrier layer(s) formed as described by way of example at the foregoing "5. Gas Barrier Layer." There being no particular limitation with respect to overcoat layer type, compositions comprising urethane-based resin(s) and silane coupling agent(s), compounds comprising organosilicon(s) and hydrolysate(s) thereof, water-soluble macromolecules having hydroxyl group(s) and/or carboxyl group(s), and other such conventionally known materials may be used, it being possible to select therefrom as appropriate in accordance with the object in question to satisfy the desired gas barrier characteristics and/or the like.

Furthermore, to the extent that it does not impair the object of the present invention, one or more of various types of additives may be added to the overcoat layer with the object of imparting it with antistatic properties, ultraviolet absorbing properties, coloration, thermal stability, lubricity, and/or the like, it being possible for the type(s) and added amount(s) of the respective additive(s) to be chosen as appropriate in correspondence to the desired object(s).

6.2. Overcoat Layer Formation Method

During overcoat layer formation, the substrate film is transported by way of metal rollers to coating equipment. As examples of how the equipment might be constituted, unwinding roller(s), coating operation(s), drying operation(s), and takeup operation(s) may be cited. During overcoating, a laminated body mounted on an unwinding roller might, by way of metal rollers, be made to pass through a coating operation and a drying operation, and to ultimately be guided to a takeup roller. There being no particular limitation with respect to coating method, gravure coating, reverse coating, dipping, low coating, air knife coating, comma coating, screen printing, spray coating, gravure offsetting, die coating, bar coating, and/or other such conventionally known methods may be employed, it being possible to select therefrom as appropriate in accordance with the desired object. Of these, gravure coating, reverse coating, and bar coating are preferred from the standpoint of productivity. As drying method, any one, or any combination of two or more, of hot air drying, hot roll drying, high-frequency irradiation, infrared radiation, UV irradiation, and other such heating methods may be employed.

At the drying operation, the substrate film is heated, and tension is moreover applied thereto between metal rollers. If the temperature to which the substrate film is heated during the drying operation is too high, not only will thermal shrinkage of the substrate film be large, but because softening will be promoted thereby, it will also be the case that the tension will tend to cause occurrence of tensile deformations, and there will tend to be occurrence of cracking at the gas barrier layer of the substrate film. Moreover, this is also not preferred because after emerging from the drying operation the temperature drop (cooling) experienced by the laminated body would be large, and the amount of shrinkage (different from thermal shrinkage) following expansion would also be large by a corresponding amount, causing occurrence of cracking at the gas bather layer and at the overcoat layer, and making it difficult to satisfy the desired gas barrier characteristics. On the other hand, while the lower the temperature to which the substrate film is heated the more preferred this would be because it would permit suppression of deformation of the substrate film, because the solvent of the liquid coating would tend not to dry, there is a concern that this could make it impossible to satisfy the desired gas barrier characteristics. It is preferred that the temperature to which the substrate film is heated be not less than 60° C. but not greater than 200° C., more preferred that this be not less than 80° C. but not greater than 180° C., and still more preferred that this be not less than 100° C. but not greater than 160° C.

7. Packaging Constitution and Manufacturing Method

A film having the foregoing properties, a laminated body comprising gas barrier layer(s) as described by way of example at "5. Gas Barrier Layer," or a laminated body comprising overcoat layer(s) as described by way of example at "6. Overcoat Layer" (these collectively being described as "film of the present invention" in the present Section 7.) may be favorably used as packaging. As packaging, vertical pillow pouches, horizontal pillow pouches, gusseted pouches, and other such pouches manufactured through use of heat sealing, weld pouches manufactured through use of weld seals, and so forth may be cited as examples. Moreover, packaging also includes lid members for plastic containers and labels for bottles which are formed in cylindrical fashion through use of center seals. The film of the present invention may be used alone to form a pouch or other material(s) may be laminated therewith. Because it is ordinarily the case that adhesion is required to form packaging, it is preferred that other layer(s) which are sealable be laminated therewith. As other layers, unstretched film comprising polyethylene terephthalate as a constituent thereof; unstretched, uniaxially stretched, or biaxially stretched film comprising other amorphous polyester(s) as constituent(s) thereof; unstretched, uniaxially stretched, or biaxially stretched film comprising nylon as constituent thereof; unstretched, uniaxially stretched, or biaxially stretched film comprising polypropylene as constituent thereof; unstretched, uniaxially stretched, or biaxially stretched film comprising polyethylene as constituent thereof and the like may be cited as examples, there being no limitation with respect thereto.

It is sufficient that at least a portion of the packaging be made up of the film of the present invention. Furthermore, while the film of the present invention may be provided at any layer(s) of the packaging, from the standpoint of ability to visually perceive printing, it is preferred that an opaque film not be arranged toward the exterior from the film of the present invention.

There being no particular limitation with respect to the method by which packaging having the film of the present invention is manufactured, heat sealing employing a heat seal bar (heat seal jaw), adhesion employing hot melt techniques, center sealing employing solvents, and/or other such conventionally known manufacturing methods may be employed.

8. Laser Types

As the type (wavelength) of laser to irradiate the film of the present invention, $CO_2$ lasers (10600 nm), YAG lasers (1064 nm), $YVO_4$ lasers (1064 nm), fiber lasers (1090 nm), green lasers (532 nm), and UV lasers (355 nm) may be cited. There being no particular limitation with respect to such laser type(s), any thereamong may be used as desired without departing from the gist of the present invention. Among the foregoing, use of YAG lasers, $YVO_4$ lasers, fiber lasers, green lasers, and UV lasers is preferred, use of Nd:YAG lasers, fiber lasers, green lasers, and UV lasers being particularly preferred.

Packaging having the film of the present invention may be favorably used as packaging material for foods, pharmaceutical agents, industrial products, and various other such goods.

WORKING EXAMPLES

Next, although the present invention is described below in more specific terms by way of working examples and comparative examples, the present invention is not to be limited in any way by the modes employed in such working examples, it being possible for changes to be made as appropriate without departing from the gist of the present invention.

Preparation of Polyester Raw Material

Synthesis Example

Dicarboxylic acid component in the form of 100 mol % dimethyl terephthalate (DMT) and polyhydric alcohol component in the form of 100 mol % ethylene glycol (EG) were loaded into a stainless steel autoclave equipped with an agitator, thermometer, and partial reflux condenser in such amounts as to cause the molar ratio of ethylene glycol to dimethyl terephthalate to be 2.2×, and 0.05 mol % (as measured as a fraction of the acid component) zinc acetate was used as transesterification catalyst to carry out the transesterification reaction while any methanol generated was distilled off from the system. Thereafter, polycondensation catalyst in the form of 0.225 mol % (as measured as a fraction of the acid component) antimony trioxide was added thereto, and the polycondensation reaction was carried out under vacuum conditions at 26.7 Pa and 280° C. to obtain Polyester A having an intrinsic viscosity of 0.75 dl/g. Note that this Polyester A was ethylene terephthalate. The composition of Polyester A is shown in TABLE 1.

Mixture Example 1

Polyester A obtained at the foregoing Synthesis Example and "Tomatec Color 42-920A (Primary Constituent $Bi_2O_3$)" laser pigment (manufactured by Tokan Material Technology Co., Ltd.) were mixed (dry blended) in a 95:5 wt % ratio, and this was fed into a screw-type extruder, where it was heated at 275° C. and melt blended. This molten resin was expelled with cylindrical shape in continuous fashion from a strand die, this being cut at a strand cutter to obtain chip-like Polyester B(masterbatch).

Note that the intrinsic viscosity IV of Polyester B was 0.72 dL/g. The composition of Polyester B is shown in TABLE 1.

Mixture Example 2

Polyester A and "Iriotec (Registered Trademark) 8825 (Primary Constituents Sn and Sb)" laser pigment (manufactured by Merck Performance Materials) were mixed (dry blended) in a 95:5 wt % ratio, and a method similar to that at Mixture Example 1 was employed to obtain Polyester C(masterbatch). Note that the intrinsic viscosity IV of Polyester C was 0.72 dL/g. The composition of Polyester C is shown in TABLE 1.

Mixture Example 3

"Silysia (Registered Trademark) 266 ($SiO_2$)" lubricant (manufactured by Fuji Silysia Chemical Ltd.) was mixed (dry blended) with Polyester A in sufficient amount to obtain a concentration of 7000 ppm therein, and a method similar to that at Mixture Example 1 was employed to obtain Polyester D(masterbatch). Note that the intrinsic viscosity IV of Polyester D was 0.72 dL/g. The composition of Polyester D is shown in TABLE 1.

TABLE 1

| Polyester raw material | Additive Brand name (type) | Amount added | Intrinsic viscosity (dL/s) |
|---|---|---|---|
| A | — | — | 0.75 |
| B | Tomatec Color 42-920A | 5 wt % | 0.72 |
| C | Iriotec ® 8825 | 5 wt % | 0.72 |
| D | Silysia ® 266 SiO$_2$ | 7000 ppm | 0.72 |

Working Example 1

Polyester A and Polyester B were mixed in a 97:3 wt % ratio as raw material for the laser printing layer (A); Polyester A and Polyester D were mixed in a 90:10 wt % ratio as raw material for the other layers (Layer B).

The raw materials mixed for Layer A and Layer B were respectively fed into different screw-type extruders, Layer A and Layer B were each melted at 285° C. and were extruded from a T die at a shear rate of 280 sec$^{-1}$. Note that agitators were attached directly above extruders, the mixed raw materials being fed into the extruders as they were made to undergo agitation by means of these agitators. A feedblock was used partway along the flow paths of the respective molten resins so as to cause them to be joined, and this was expelled from a die and cooled on a chill roller, the surface temperature of which was set to 30° C., to obtain unstretched laminated film. Molten resin flow paths were established so as to cause the laminated film to be such that the central layer thereof was Layer A, and the two surfacemost layers thereof were Layer B(i.e., a B/A/B constitution in which there were three layers of two species), the amounts expelled therefrom being adjusted so as to cause the thickness ratio of Layer A and Layer B to be 90/10 (B/A/B=5/90/5).

The cooled and solidified unstretched laminated film which was obtained was guided to a machine direction stretching device in which a plurality of groups of rollers were arranged in continuous fashion, this was made to undergo preheating on preheating rollers until the film temperature reached 90° C., following which this was stretched by a factor of 3.5×.

Following machine direction stretching, the film was guided to a transverse direction stretching device (tenter), where it was made to undergo preheating for 5 seconds until the surface temperature thereof reached 110° C., following which it was stretched by a factor of 4.1× in the transverse direction (horizontal direction). Following transverse direction stretching, the film was guided while still in that state to an intermediate zone, being made to pass therethrough in 1 second. In the intermediate zone of the tenter, note that hot air from the heat treatment zone and from the zone in which stretching in the transverse direction was carried out were blocked so that it became that rectangular strips came to hang down from above in almost perfectly vertical fashion when those strips had been made to hang down from above while the film was not passing therethrough.

Thereafter, following passage through the intermediate zone, the film was guided to the heat treatment zone, where heat treatment was carried out for 7 seconds at 220° C. At this time, at the same time that heat treatment was being carried out, the distance between clips in the transverse direction of the film was reduced, causing this to undergo 3% relaxation treatment in the transverse direction. Following passage through the final heat treatment zone, the film was cooled for 5 seconds in a cooling airstream at 30° C.

Portions were cut and removed from the two edges thereof and this was rolled up into a roll 400 mm in width to continuously manufacture a prescribed length of biaxially stretched film of thickness 30 µm. The properties of the film that was obtained were evaluated in accordance with the foregoing methods. Manufacturing conditions and the results of evaluation are shown in TABLE 2.

Working Examples 2 Through 8

Working Examples 2 through 8 were conducted in similar fashion as at Working Example 1, raw material mixing conditions, expelling conditions, machine direction stretching temperature, machine direction stretching ratio, transverse direction stretching temperature, transverse direction stretching ratio, and heat treatment temperature being variously altered to continuously form polyester film. Note that the film at Working Example 5 had a constitution in which there were two layers of two species, these being Layer A and Layer B, the thickness ratio thereof being A/B=80/20. Furthermore, the film at Working Example 6 was a single-layer film in which there was only Layer A. Furthermore, the film at Working Example 7 did not undergo stretching (the stretching ratio was 1) in the machine direction, being a uniaxially stretched film that was formed by undergoing stretching in the transverse direction only. Manufacturing conditions and the results of evaluation for the respective films are shown in TABLE 2.

Working Example 9

At Working Example 9, a gas barrier layer was laminated to one face of the film roll of Working Example 2 to continuously fabricate a gas bather laminated body that was obtained in the form of a roll. More specifically, aluminum was used as vapor deposition source, vacuum deposition being employed to cause aluminum oxide (AlOx) to be laminated to one face of the film as oxygen gas was introduced into the vapor deposition apparatus. Note that thickness of the gas barrier layer was 10 nm. Manufacturing conditions and the results of evaluation for the laminated body which was obtained are shown in TABLE 2.

Working Example 10

At Working Example 10, a gas bather layer was laminated to one face of the film roll of Working Example 2 to continuously fabricate a gas barrier laminated body, an overcoat layer being thereafter fabricated over the gas barrier layer to obtain a roll. More specifically, aluminum oxide (AlOx) and silicon oxide (SiOx) were used as vapor deposition sources, vacuum deposition being employed to cause a gas bather layer to be laminated to one face of the film. Note that thickness of the gas barrier layer was 30 nm. A solution in which tetraethoxysilane hydrolysate solution and polyvinyl alcohol had been mixed in a 50:50 ratio was continuously applied to the side of this laminated body at which the gas barrier layer was present, and this was thereafter guided to a drying oven set to a temperature of 120° C. and an airspeed of 15 m/sec to continuously form an overcoat layer thereon. Note that thickness of the overcoat layer was 300 nm. Manufacturing conditions and the results of evaluation for the laminated body which was obtained are shown in TABLE 2.

Comparative Examples 1 Through 4

Comparative Examples 1 through 3 were conducted in similar fashion as at Working Example 1, raw material mixing conditions, expelling conditions, machine direction stretching temperature, machine direction stretching ratio, transverse direction stretching temperature, transverse direction stretching ratio, and heat treatment temperature being variously altered to continuously form polyester film. Manufacturing conditions and the results of evaluation for the respective films are shown in TABLE 2.

Film Evaluation Methods

Film evaluation methods were as follows. Measurement samples were taken from the central region in the transverse direction of the film. Note that when due to the small area of the film or the like it could not immediately be determined which was the machine direction and which was the transverse direction, where measurements were made based on provisionally established determinations regarding the machine direction and the transverse direction, this should pose no particular problem even where the provisionally established determinations regarding the machine direction and the transverse direction were rotated by 90° from the true directions.

Film Thickness

One sample of A4 size (21.0 cm×29.7 cm) was cut from the film. A micrometer was used to measure thickness of this sample at 10 different locations, and the average thickness (μm) was calculated.

Type and Amount of Laser Printing Pigment Contained in All Film Layers

Quantitative Measurement of Amounts of Nd, Bi, Sb, Sn, and P

A 0.1 g amount of sample was accurately weighed in a Teflon (registered trademark) container of a microwave sample digestion system (Multiwavepro; manufactured by Anton Paar), 6 mL of concentrated nitric acid was added to this, the special-purpose lid was placed thereon and this was inserted in the outer vessel therefor and was placed in the device. This was subjected to heated processing for 60 minutes at what was ultimately 200° C. in the device. This was thereafter allowed to cool to room temperature, 50 mL of the processed solution was placed in a digitube, and the Teflon (registered trademark) container as it existed following processing was while being washed with ultrapure water placed in same tube, this being treated as a 50 mL fixed volume thereof to prepare the measurement sample. The processed solution was thereafter measured using a high-frequency inductively coupled plasma optical emission analyzer (Spectroblue; manufactured by Hitachi High-Tech Science Corporation), quantitative measurement of the amounts of metallic elements within the sample being carried out using calibration curves prepared using reference solutions for the target elements. Taking the amount of the element present within sample to be A (ppm), taking the concentration of the element in the solution before processing to be 13 (mg/L), and taking the concentration of the element in the blank test solution (measurement blank) to be C(mg/L), Formula (2), below, was used to determine the amount of the metallic element in 0.1 g of sample.

$$A=(B-C)\times 50/0.1 \quad \text{Formula(2)}$$

Quantitative Measurement of Amounts of Other Metallic Elements

A 0.1 g amount of sample was accurately weighed in a crucible made of platinum, and this was precarburized to 400° C. on a hotplate. A Model No. FO610 Electric Furnace manufactured by Yamato Scientific Co., Ltd., was thereafter used to carry out ashing processing for 8 hours at 550° C. Following ashing processing, 3 mL of 6.0 N hydrochloric acid was added thereto, this was subjected to acidic decomposition at 100° C. on a hotplate, heated processing being carried out until the hydrochloric acid had been completely volatilized. Following completion of acidic decomposition, 20 mL of 1.2 N hydrochloric acid was used to obtain a fixed volume thereof. The processed solution was thereafter measured using a high-frequency inductively coupled plasma optical emission analyzer (Spectroblue; manufactured by Hitachi High-Tech Science Corporation), quantitative measurement of the amounts of metallic elements within the sample being carried out using calibration curves prepared using reference solutions for the target elements. Taking the amount of the element present within sample to be A (ppm), taking the concentration of the element in the solution before processing to be B(mg/L), and taking the concentration of the element in the blank test solution (measurement blank) to be C(mg/L). Formula (3), below, was used to determine the amount of the metallic element in 0.1 g of sample.

$$A=(B-C)\times 20/0.1 \quad \text{Formula(3)}$$

Haze

Measurement was carried out using a hazemeter (300A; manufactured by Nippon Denshoku Industries Co., Ltd.) in accordance with JIS-K-7136. Measurements were carried out twice, and the average thereof was determined.

Color L* Value and Color b* Value

A spectroscopic color difference meter (ZE-6000; manufactured by Nippon Denshoku Industries Co., Ltd.) was used in reflection mode to measure the color (L* value and b* value) of a single film sample.

Unevenness in Thickness in Machine Direction

Sampling of film in the form of a roll that was 40 mm in the transverse direction and 11 m in the machine direction was carried out, a continuous contact thickness gauge manufactured by Mikuron Kabushikigaisha being used to continuously measure thickness in the machine direction of the film (for a measured length of 10 m) at a measuring speed of 5 m/min. Taking the maximum thickness at the time of measurement to be Tmax., the minimum thickness to be Tmin., and the average thickness to be Tave., the unevenness in thickness in the machine direction of the film was calculated using Formula 4, below.

$$\text{Unevenness in thickness}=\{(Tmax.-Tmin.)/Tave.\}\times 100(\%) \quad \text{Formula(4)}$$

Unevenness in Thickness in Transverse Direction

Sampling of film in the form of a wide strip that was 500 mm in the transverse direction and 40 mm in the machine direction was carried out, a continuous contact thickness gauge manufactured by Mikuron Kabushikigaisha being used to continuously measure thickness in the transverse direction of the film sample (for a measured length of 400 mm) at a measuring speed of 5 m/min. Taking the maximum thickness at the time of measurement to be Tmax., the minimum thickness to be Tmin., and the average thickness to be Tave., the unevenness in thickness in the transverse direction of the film was calculated using Formula 4, above.

Refractive Index

Measurement was carried out using an Abbe refractometer (NAR-4T; manufactured by Atago Co., Ltd.; measurement wavelength 589 nm). Diiodomethane was used as immersion liquid to measure refractive index in the machine direction (Nx), refractive index in the transverse direction (Ny), and refractive index in the thickness direction (Nz). Measurements were carried out twice, and the average thereof was determined.

Thermal Shrinkage

In both the machine direction and the transverse direction, pieces 10 mm in width and 250 mm in length were cut therefrom, marks being made with an interval of 200 mm therebetween, the interval (A) between marks being measured while under a constant tension of 5 gf. The film was then subjected to heat treatment for 30 minutes at 140° C. while under no load, the interval (B) between marks was thereafter measured while under a constant tension of 5 gf, and Formula (5) was used to determine thermal shrinkage. Thermal shrinkage was determined in this fashion for determination of the thermal shrinkage in the machine direction and in the transverse direction.

Thermal shrinkage (%)={(A−B)/A}×100   Formula(5)

Tensile Fracture Strength

Strip-like film samples which were 140 mm in the measurement direction and 20 mm in the direction (transverse direction of the film) perpendicular to the measurement direction were prepared in accordance with JIS K7113. An "Autograph AG-Xplus" universal tensile tester (manufactured by Shimadzu Corporation) was used, the two ends of the test piece being held such that a 20 mm length thereof was gripped by a chuck at either end (chuck separation 100 mm), tensile testing being carried out under conditions of 23° C. ambient temperature and 200 mm/min elongation rate, strength (stress) at the time of tensile fracture being taken to be the tensile fracture strength (MPa). Note that the machine direction and the transverse direction were used as measurement directions.

Intrinsic Viscosity (IV)

Intrinsic viscosity (IV) of the heat seal layer was determined in accordance with JISK7367-5. The value that gave concentration by mass (c)=0 based on the relationship for viscosity index as a function of the concentration by mass (c) of a solution, where the viscosity index used was that obtained when measurement was carried out at 30±0.1° C. using an Ubbelohde viscometer, was taken to be the IV thereof. Note that a 60/40 (wt %) mixture of phenol and 1,1,2,2-tetrachloroethane was used as measurement solvent.

Water Vapor Permeability

Water vapor permeability was measured in accordance with the method at JIS K7126B. A water vapor permeability measurement apparatus (Permatran-W3/33MG; manufactured by Mocon) was used to measure water vapor permeability of a hygrostatic gas passing therethrough in the direction from the heat seal layer side at an ambient humidity of 90% RH and a temperature of 40° C. Note that prior to measurement the moisture content of the sample was adjusted by allowing it to stand for 4 hours in a 65% RH humidity environment.

Oxygen Permeability

Oxygen permeability was measured in accordance with the method at JIS K7126-2. An oxygen permeability measurement apparatus (Ox-Tran 2/20; manufactured by Mocon) was used to measure oxygen permeability of oxygen passing therethrough in the direction from the heat seal layer side at an ambient humidity of 65% RH and a temperature of 23° C. Note that prior to measurement the moisture content of the sample was adjusted by allowing it to stand for 4 hours in a 65% RH humidity environment.

Evaluation of Laser Irradiation Printing (Visual Inspection)

Film was irradiated with a laser to print the characters "ABC 123", and print density was evaluated by visual inspection. A 355 nm-wavelength ultraviolet (UV) laser marker (MD-U1000; manufactured by Keyence Corporation) was used as printing apparatus, laser irradiation being carried out at conditions of laser power 40%, scan speed 1000 mm/second, pulse frequency 40 kHz. and spot variability −20. Print density was judged based on the following criteria.

GOOD Characters were recognizable as a result of visual inspection

BAD Characters were unrecognizable as a result of visual inspection

TABLE 2

|  |  |  | Working Example 1 | Working Example 2 | Working Example 3 | Working Example 4 | Working Example 5 | Working Example 6 | Working Example 7 |
|---|---|---|---|---|---|---|---|---|---|
| Manufacturing conditions | Raw material composition at laser printing layer (Layer A) [mass %] | Polyester A | 97 | 97 | 97 | 97 | 97 | 87 | 97 |
|  |  | Polyester B | 3 | 3 | 4 | 5 | 3 | 3 | 3 |
|  |  | Polyester C | 0 | 0 | 0 | 0 | 0 | 0 | 0 |
|  |  | Polyester D | 0 | 0 | 0 | 0 | 0 | 10 | 0 |
|  | Raw material composition at layers (Layer B) other than laser printing layer [mass %] | Polyester A | 90 | 90 | 90 | 90 | 90 | — | 90 |
|  |  | Polyester B | 0 | 0 | 0 | 0 | 0 | — | 0 |
|  |  | Polyester C | 0 | 0 | 0 | 0 | 0 | — | 0 |
|  |  | Polyester D | 10 | 10 | 10 | 10 | 10 | — | 10 |
|  | Amount of laser pigment added at Layer A [wt %] |  | 0.15 | 0.15 | 0.2 | 0.25 | 0.15 | 0.15 | 0.15 |
|  | Agitator used directly above extruder? |  | Yes | Yes | Yes | Yes | Yes | Yes | Yes |
|  | Extrusion shear rate [sec$^{-1}$] |  | 280 | 280 | 280 | 200 | 280 | 440 | 280 |
|  | Layered constitution |  | B/A/B | B/A/B | B/A/B | B/A/B | A/B | A | B/A/B |
|  | Relative thickness of respective layers (LayerB/Layer A/Layer B) [%] |  | 5/90/5 | 5/90/5 | 5/90/5 | 5/90/5 | 80/20 | 100 | 5/90/5 |
|  | Thickness of laser printing layer (Layer A) [μm] |  | 27 | 45 | 63 | 81 | 40 | 50 | 45 |
|  | Stretching in machine direction (vertical stretching) | Stretching temperature [° C.] | 90 | 95 | 95 | 100 | 95 | 95 | — |
|  |  | Stretching ratio | 3.5 | 3.5 | 3.5 | 3.5 | 3.5 | 3.5 | 1 |
|  | Stretching in transverse direction | Stretching temperature [° C.] | 110 | 115 | 115 | 120 | 115 | 115 | 95 |

TABLE 2-continued

|  |  |  |  |  |  |  |  |  |  |
|---|---|---|---|---|---|---|---|---|---|
|  | (horizontal stretching) | Stretching ratio | 4.1 | 4.1 | 4.1 | 4.1 | 4.1 | 4.1 | 4.2 |
|  | Heat treatment | Temperature [° C.] | 220 | 220 | 220 | 220 | 220 | 220 | 180 |
|  |  | Percent relaxation (transverse direction) [%] | 3 | 3 | 3 | 3 | 3 | 3 | 3 |
|  | Gas barrier layer | Type | — | — | — | — | — | — | — |
|  |  | Thickness [nm] | — | — | — | — | — | — | — |
|  | Overcoat layer | Thickness [nm] | — | — | — | — | — | — | — |
| Properties | Film thickness [μm] |  | 30 | 50 | 70 | 90 | 50 | 50 | 50 |
|  | Total amount of laser printing pigment in all layers | Metal species | Bi | Bi | Bi | Bi | Bi | Bi | Bi |
|  |  | Amount [ppm] | 1600 | 1500 | 2000 | 2500 | 1500 | 1500 | 1500 |
|  | Haze [%] |  | 7.4 | 16.9 | 21.7 | 28.1 | 12.1 | 15.7 | 7.7 |
|  | Color values | L* | 92.7 | 92.4 | 92.1 | 91.7 | 92.3 | 92.2 | 93.2 |
|  |  | b* | 0.43 | 1.01 | 1.30 | 1.77 | 0.75 | 1.00 | 0.35 |
|  | Unevenness in thickness [%] | Machine direction | 4.5 | 4.8 | 4.7 | 8.2 | 4.3 | 5.1 | 2.2 |
|  |  | Transverse direction | 5.8 | 5.3 | 6.2 | 9.1 | 7.9 | 6.8 | 11.5 |
|  | Refractive index | Machine direction (Nx) | 1.6421 | 1.6414 | 1.6416 | 1.6411 | 1.6476 | 1.6422 | 1.5374 |
|  |  | Transverse direction (Ny) | 1.6741 | 1.6747 | 1.6719 | 1.6707 | 1.6763 | 1.6747 | 1.6618 |
|  |  | Thickness direction (Nz) | 1.4934 | 1.4949 | 1.4953 | 1.499 | 1.491 | 1.49 | 1.5583 |
|  | Thermal shrinkage (140° C.) [%] | Machine direction | 1.1 | 1.0 | 1.4 | 1.8 | 0.9 | 1.0 | 2.8 |
|  |  | Transverse direction | 1.5 | 1.4 | 1.8 | 2.3 | 1.2 | 1.4 | 2.5 |
|  | Tensile fracture strength [MPa] | Machine direction | 210 | 204 | 202 | 198 | 211 | 212 | 62 |
|  |  | Transverse direction | 238 | 240 | 234 | 237 | 245 | 244 | 213 |
|  | Intrinsic viscosity [dL/g] |  | 0.71 | 0.71 | 0.71 | 0.71 | 0.71 | 0.71 | 0.71 |
|  | Water vapor permeability [g/(m² · d)] |  | 41 | 25 | 20 | 21 | 24 | 25 | 31 |
|  | Oxygen permeability [cc/(m² · d · atm)] |  | 19 | 12 | 10 | 14 | 14 | 15 | 17 |
|  | Evaluation of laser irradiation printing (visual inspection) |  | GOOD | GOOD | GOOD | GOOD | GOOD | GOOD | GOOD |

|  |  |  | Working Example 8 | Working Example 9 | Working Example 10 | Comparative Example 1 | Comparative Example 2 | Comparative Example 3 | Comparative Example 4 |
|---|---|---|---|---|---|---|---|---|---|
| Manufacturing conditions | Raw material composition at laser printing layer (Layer A) [mass %] | Polyester A | 95 | 97 | 97 | 100 | 97 | 93 | 93 |
|  |  | Polyester B | 0 | 3 | 3 | 0 | 3 | 7 | 7 |
|  |  | Polyester C | 5 | 0 | 0 | 0 | 0 | 0 | 0 |
|  |  | Polyester D | 0 | 0 | 0 | 0 | 0 | 0 | 0 |
|  | Raw material composition at layers (Layer B) other than laser printing layer [mass %] | Polyester A | 90 | 90 | 90 | 90 | 90 | 90 | 90 |
|  |  | Polyester B | 0 | 0 | 0 | 0 | 0 | 0 | 0 |
|  |  | Polyester C | 0 | 0 | 0 | 0 | 0 | 0 | 0 |
|  |  | Polyester D | 10 | 10 | 10 | 10 | 10 | 10 | 10 |
|  | Amount of laser pigment added at Layer A [wt %] |  | 0.15 | 0.15 | 0.15 | 0 | 0.15 | 0.35 | 0.15 |
|  | Agitator used directly above extruder? |  | Yes | Yes | Yes | Yes | Yes | Yes | No |
|  | Extrusion shear rate [sec⁻¹] |  | 280 | 280 | 280 | 280 | 280 | 280 | 80 |
|  | Layered constitution |  | B/A/B | B/A/B | B/A/B | B/A/B | B/A/B | B/A/B | B/A/B |
|  | Relative thickness of respective layers (LayerB/Layer A/Layer B) [%] |  | 5/90/5 | 5/90/5 | 5/90/5 | 5/90/5 | 5/90/5 | 5/90/5 | 5/90/5 |
|  | Thickness of laser printing layer (Layer A) [μm] |  | 45 | 45 | 45 | 45 | 113 | 45 | 45 |
|  | Stretching in machine direction (vertical stretching) | Stretching temperature [° C.] | 95 | 95 | 95 | 95 | 105 | 95 | 95 |
|  |  | Stretching ratio | 3.5 | 3.5 | 3.5 | 3.5 | 3.3 | 3.5 | 3.5 |
|  | Stretching in transverse direction | Stretching temperature [° C.] | 115 | 115 | 115 | 115 | 120 | 115 | 115 |

TABLE 2-continued

| | | | | | | | | |
|---|---|---|---|---|---|---|---|---|
| | (horizontal stretching) | Stretching ratio | 4.1 | 4.1 | 4.1 | 4.1 | 3.8 | 4.1 | 4.1 |
| | Heat treatment | Temperature [° C.] | 220 | 220 | 220 | 220 | 215 | 220 | 220 |
| | | Percent relaxation (transverse direction) [%] | 3 | 3 | 3 | 3 | 3 | 3 | 3 |
| | Gas barrier layer | Type | — | AlOx | AlOx/SiOx | — | — | — | — |
| | | Thickness [nm] | — | 10 | 30 | — | — | — | — |
| | Overcoat layer | Thickness [nm] | — | — | 300 | — | — | — | — |
| Properties | Film thickness [μm] | | 50 | 50 | 50 | 50 | 125 | 50 | 50 |
| | Total amount of laser printing pigment in all layers | Metal species | Sn and Sb | Bi | Bi | — | Bi | Bi | Bi |
| | | Amount [ppm] | 400 | 1500 | 1500 | — | 1500 | 3000 | 3000 |
| | Haze [%] | | 19.6 | 15.4 | 16.1 | 5.4 | 45.7 | 19.2 | 18.9 |
| | Color values | L* | 91.0 | 92.2 | 92.2 | 94.1 | 72.3 | 92.3 | 92.4 |
| | | b* | 1.31 | 0.88 | 0.88 | 0.24 | 3.02 | 1.33 | 1.31 |
| | Unevenness in thickness [%] | Machine direction | 14.3 | 5.4 | 5.8 | 7.5 | 10.3 | 21.3 | 23.2 |
| | | Transverse direction | 15.8 | 7.6 | 6.7 | 8.3 | 11.6 | 28 | 13.5 |
| | Refractive index | Machine direction (Nx) | 1.6321 | 1.6418 | 1.6424 | 1.6416 | 1.6121 | 1.6031 | 1.6011 |
| | | Transverse direction (Ny) | 1.6678 | 1.6743 | 1.6746 | 1.6752 | 1.6533 | 1.6242 | 1.6237 |
| | | Thickness direction (Nz) | 1.5017 | 1.4943 | 1.4945 | 1.4922 | 1.5134 | 1.521 | 1.5295 |
| | Thermal shrinkage (140° C.) [%] | Machine direction | 1.4 | 1.0 | 1.0 | 1.6 | 1.4 | 0.6 | 0.5 |
| | | Transverse direction | 1.9 | 1.2 | 1.2 | 2.0 | 1.8 | 0.8 | 1.1 |
| | Tensile fracture strength [MPa] | Machine direction | 189 | 215 | 210 | 210 | 198 | 203 | 188 |
| | | Transverse direction | 225 | 238 | 233 | 240 | 203 | 228 | 214 |
| | Intrinsic viscosity [dL/g] | | 0.71 | 0.71 | 0.71 | 0.71 | 0.71 | 0.71 | 0.71 |
| | Water vapor permeability [g/(m² · d)] | | 20 | 3.1 | 0.2 | 22 | 10 | 25 | 28 |
| | Oxygen permeability [cc/(m² · d · atm)] | | 12 | 2.8 | 0.4 | 10 | 5 | 13 | 14 |
| | Evaluation of laser irradiation printing (visual inspection) | | GOOD | GOOD | GOOD | GOOD | GOOD | GOOD | GOOD |

Film Manufacturing Conditions and Results of Evaluation

The films at Working Examples 1 through 10 were all excellent in terms of the properties listed at TABLE 2, satisfactory results of evaluation having been obtained.

On the other hand, for the reasons given below, the results at Comparative Examples 1 through 3 were all unsatisfactory.

At Comparative Example 1, because laser pigment was not present therein, printing was not achieved despite irradiation thereof by laser.

At Comparative Example 2, because thickness of the laser printing layer was large, being 113 μm, haze and color L* and b* values exceeded prescribed ranges therefor, and the external appearance thereof was such that it was no longer suitable for use as packaging.

At Comparative Example 3, because laser pigment concentration was high, being 0.35%, unevenness in thickness following stretching of the film exceeded 20% in both the machine direction and the transverse direction. For this reason, it was also the case that there was occurrence of wrinkling when it was wound up into a roll due to the bad unevenness in thickness.

At Comparative Example 4, because conditions were such that shear rate was low, an agitator not having been used at the time that the raw materials were melt extruded, there was worsening of unevenness in thickness in the machine direction.

INDUSTRIAL UTILITY

Because polyester film in accordance with the present invention makes it possible to provide a film in accordance therewith that is capable of being printed in distinct fashion by a laser, that excels with respect to unevenness in thickness, and that is of high transparency, it may be favorably used tier labels and other such applications. It at the same time makes it possible to provide packaging which employs such film and on which printing has been directly carried out.

The invention claimed is:
1. A polyester-based film comprising:
   a layer permitting printing as a result of laser irradiation; and
   a first surfacemost layer,
   wherein the layer permitting printing as a result of laser irradiation is a stretched layer,
   wherein not less than 100 ppm but not greater than 3000 ppm of laser-printable metal is present in all layers of the polyester-based film, wherein the first surfacemost layer contains microparticles, wherein content of the microparticles in the polyester-based film is not greater than 1 wt %, wherein haze of the polyester-based film is not less than 1% but not greater than 40%, and wherein unevenness in thickness of the polyester-based film in at least either a machine direction or a transverse direction is not less than 0.1% but not greater than 20%.

2. The polyester-based film according to claim 1, wherein the laser-printable metal is at least one selected from the group consisting of bismuth, gadolinium, neodymium, titanium, antimony, tin, aluminum, and oxides thereof.

3. The polyester-based film according to claim 1, wherein a thickness of the layer permitting printing as a result of laser irradiation is not less than 5 µm but not greater than 100 µm.

4. The polyester-based film according to claim 1, wherein a color L* value of the polyester-based film is not less than 90 but not greater than 95, and wherein a color b* value of the polyester-based film is not less than 0.1 but not greater than 2.

5. The polyester-based film according to claim 1, wherein the first surfacemost layer is disposed adjacent to the layer permitting printing as a result of laser irradiation and does not undergo printing as a result of the laser irradiation.

6. The polyester-based film according to claim 1, wherein refractive indices in the machine direction and the transverse direction are such that the higher therebetween is not less than 1.63.

7. The polyester-based film according to claim 1, wherein thermal shrinkage in at least either the machine direction the transverse direction following exposure for 30 minutes to 140° C. hot air is not less than 0.5% but not greater than 8%.

8. The polyester-based film according to claim 1, wherein the polyester-based film is a biaxially stretched polyester-based film.

9. The polyester-based film according to claim 1, wherein the unevenness in thickness of the polyester-based film in both the machine direction and the transverse direction is not less than 0.1% but not greater than 20%.

10. The polyester-based film according to claim 1, wherein the unevenness in thickness of the polyester-based film in both the machine direction and the transverse direction is not less than 0.1% but not greater than 18%.

11. The polyester-based film according to claim 1, wherein the unevenness in thickness of the polyester-based film in both the machine direction and the transverse direction is not less than 0.1% but not greater than 16%.

12. The polyester-based film according to claim 1, wherein thickness of the polyester-based film is not less than 8 µm but not greater than 200 µm.

13. The polyester-based film according to claim 1, further comprising:
a second surfacemost layer;
wherein the layer permitting printing as a result of laser irradiation is between the first surfacemost layer and the second surfacemost layer.

14. The polyester-based film according to claim 1, wherein the polyester-based film is a polyethylene terephthalate-based film.

15. The polyester-based film according to claim 1, wherein not less than 150 ppm but not greater than 2950 ppm of the laser-printable metal is present in all layers of the polyester-based film.

16. The polyester-based film according to claim 1, wherein not less than 200 ppm but not greater than 2900 ppm of the laser-printable metal is present in all layers of the polyester-based film.

17. A packaging comprising a label or lid member employing the polyester-based film according to claim 1.

18. The packaging according to claim 17, wherein at least a portion thereof has undergone printing.

* * * * *